Oct. 11, 1932.  S. KARPEN ET AL  1,882,649
SPRING STRUCTURE
Filed June 22, 1931   2 Sheets-Sheet 1
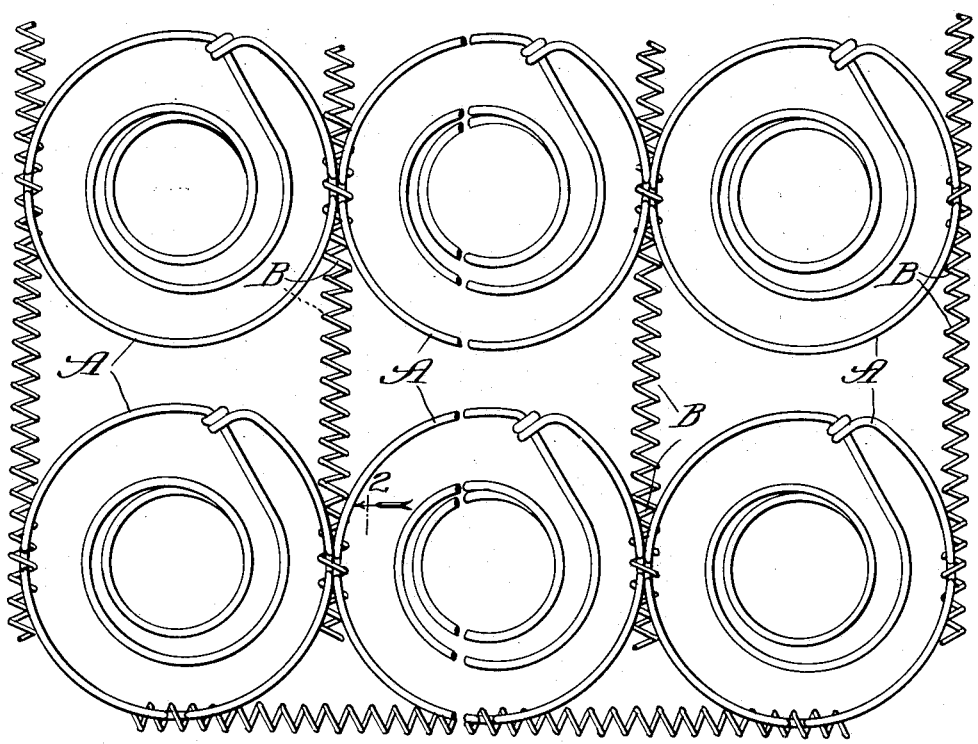

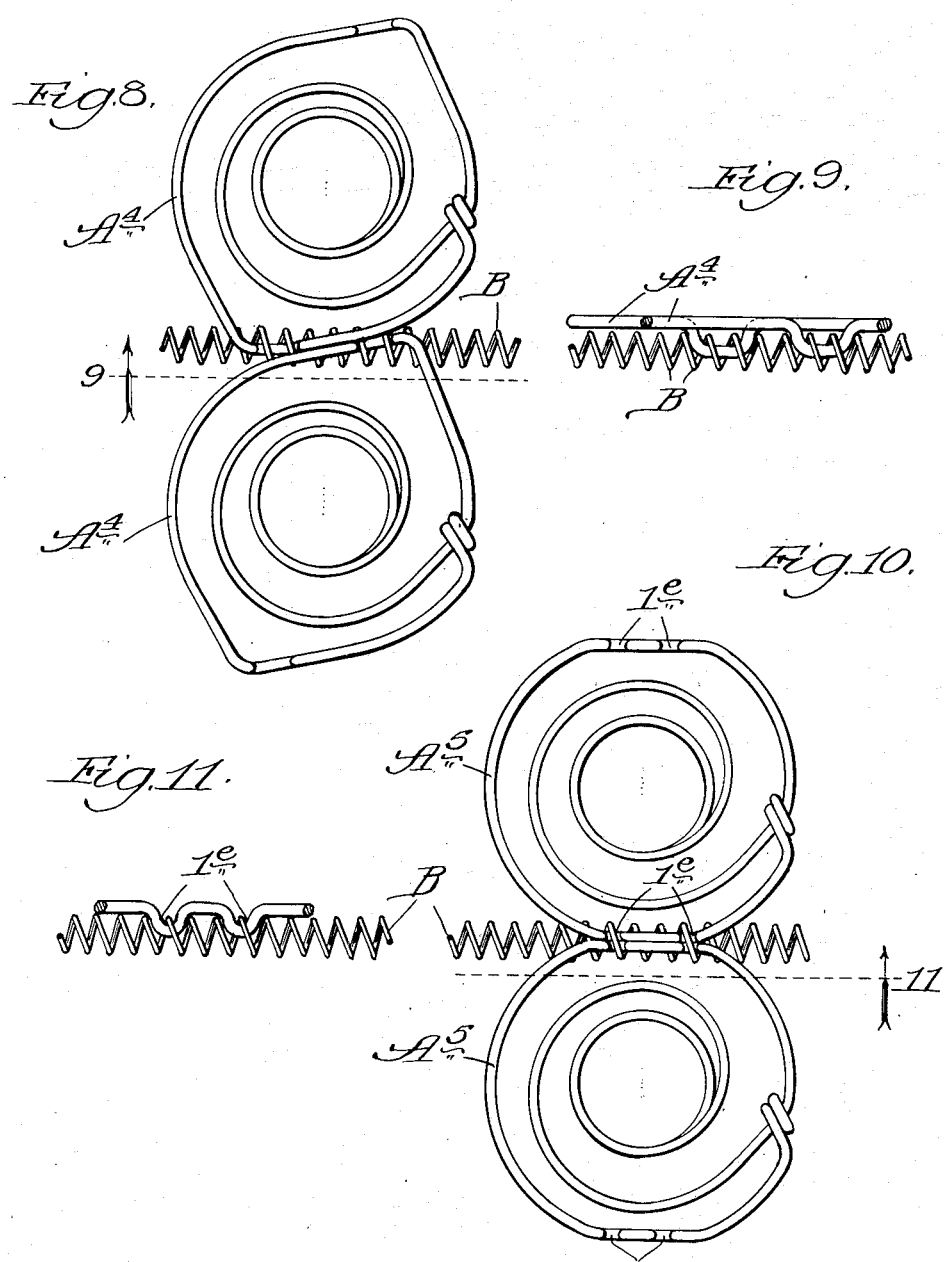

Patented Oct. 11, 1932

1,882,649

UNITED STATES PATENT OFFICE

SOLOMON KARPEN AND CHARLES LOFMAN, OF CHICAGO, ILLINOIS, ASSIGNORS TO S. KARPEN & BROS., OF CHICAGO, ILLINOIS, A CORPORATION OF WEST VIRGINIA

SPRING STRUCTURE

Application filed June 22, 1931. Serial No. 546,078.

This invention relates particularly to spring-structures adapted for use for various purposes, as for use in mattresses, bed springs, or for upholstery purposes.

The invention is illustrated in a preferred embodiment in the accompanying drawings, in which—

Fig. 1 is a broken plan view of the spring-structure embodying the invention; Fig. 2, a broken elevational view taken as indicated at line 2 of Fig. 1; Fig. 3, a detail sectional view taken as indicated at line 3 of Fig. 2; Fig. 4, a broken plan view showing a slight modification; Fig. 5, a broken elevational view taken as indicated at line 5 of Fig. 4; Fig. 6, a broken plan view of another modification; Fig. 7, a broken plan view of still another modification; Fig. 8, a broken plan view of another modification; Fig. 9, a broken sectional view taken as indicated at line 9 of Fig. 8; Fig. 10, a broken plan view of a further modification; Fig. 11, a broken vertical section taken as indicated at line 11 of Fig. 10;

Referring to Figs. 1–3, the spring-structure is shown as comprising rows of coil springs A, A and helical connectors B joining the end-rings of the springs.

The springs A may, if desired, be of the hour-glass type of upholstery springs, in which event helical connectors will ordinarily be employed to connect the end-rings at both sides of the spring-structure.

The characterizing feature of the present invention is that the helical connectors employed are disposed below or back of the plane of the end-rings which they serve to connect. This is accomplished by providing the end-rings, designated 1, with downwardly struck offsets or depressions $1^a$, the helical connectors being screwed or threaded through the structure in such manner as to connect together adjacent end-rings.

In the construction now being described, the offset $1^a$ which is below the plane of the end-rings is quite narrow, so as to receive a single convolution of the connector, as shown in Fig. 2. The V-form depression is only slightly larger than is required to accommodate the light-gauge wire of the connector. The result is that the upholstery springs cannot shift objectionably with relation to the connector. Thus, the adjacent end-rings are not only connected closely together, but are prevented from shifting in a direction longitudinally of the connector.

In the modification shown in Figs. 4 and 5, the upholstery springs are designated $A'$, and the connectors are designated B. In this illustration, the depressed offset, designated $1^b$, is shown wide enough to receive three convolutions of the connector and to interlock with these convolutions in such manner as to prevent shifting of the upholstery spring.

In the modification shown in Fig. 6, the upholstery springs are designated $A^2$. In this example, the depressed portions of the end-rings, designated $1^c$, are parallel instead of being curved. In the example given, the parallel portions of the wires are of sufficient length to accommodate seven convolutions of the connector. The relation is such as to prevent shifting of the end-rings with respect to each other.

In the modification shown in Fig. 7, the upholstery springs are designated $A^3$. In this example, the upholstery springs are staggered somewhat. Each spring is shown having its end-ring provided with a depressed offset $1^d$; and the off-sets are staggered and engaged by different convolutions of the connector.

In the modification shown in Figs. 8 and 9, the upholstery springs are designated $A^4$. This modification corresponds with that shown in Fig. 7, except that the centers of the upholstery springs are kept in alignment.

In the modification shown in Figs. 10 and 11, the upholstery springs are designated $A^5$. In this instance, the end-rings are provided with small, spaced depressions $1^e$, each of which depressions receives a convolution of the helical connector B.

In each illustration given, the connector is located below the upper or outer plane of the end-rings. Thus, there is no danger that the offsets will, owing to distortion or skewing of the end-rings, cause injury to any fabrics which may come in contact with the spring-structure. The same applies to the connectors themselves, which are located below or back of the plane of the end-rings.

In each construction described, the spiral connectors are arranged between adjacent rows of upholstery springs and have screw-engagement with adjacent depressed portions of adjacent end-rings.

The spiral connectors may be said to be substantially tangential to the end-rings, although substantially located below the plane of the end-rings.

Other modifications within the spirit of the invention may suggest themselves to those skilled in the art.

What we regard as new, and desire to secure by Letters Patent, is:

A spring-structure, comprising parallel rows of upholstery springs having end-rings disposed substantially in contact at lines between said rows, said end-rings having depressions at their adjacent portions, and helical connectors arranged between said rows below the plane of the end-rings and having threaded engagement with said depressions, said depressions bearing a staggered relation transversely with respect to the connectors, each connector adapted to tie together two rows of said springs and to hold the members of each row against shifting longitudinally with relation to the connector.

SOLOMON KARPEN.
CHARLES LOFMAN.